United States Patent [19]

Rudnick

[11] Patent Number: 5,001,860
[45] Date of Patent: Mar. 26, 1991

[54] PLANT CONTAINER AND DISPLAY DEVICE

[75] Inventor: Wallace Rudnick, Great Neck, N.Y.

[73] Assignee: Three Rivers Amphibian, Inc., Tampa, Fla.

[21] Appl. No.: 363,699

[22] Filed: Jun. 9, 1989

[51] Int. Cl.$^5$ ............................................. A01G 9/14
[52] U.S. Cl. ........................................ 47/69; 47/60; 47/81; 206/423
[58] Field of Search ................... 47/69, 81, 61, 66, 77, 47/60; 206/423

[56] References Cited

U.S. PATENT DOCUMENTS

| | | | |
|---|---|---|---|
| 3,177,616 | 4/1965 | Sawyer | 47/61 |
| 3,225,805 | 12/1965 | Wise | 206/423 |
| 3,242,614 | 3/1966 | Thompson | 47/66 |
| 3,995,397 | 12/1976 | Pespard | 47/81 |
| 4,118,889 | 10/1978 | Lamlee | 47/69 |
| 4,180,941 | 1/1980 | Korematsu | 47/61 |
| 4,328,641 | 5/1982 | Tesch | 47/77 |
| 4,471,572 | 9/1984 | Young | 47/61 |

FOREIGN PATENT DOCUMENTS 6607879 12/1967 Netherlands .
7603758 10/1977 Netherlands ...................... 206/423

Primary Examiner—Henry E. Raduazo
Attorney, Agent, or Firm—Pettis & McDonald

[57] ABSTRACT

A plant display container with seeds and growth medium whereby growth of a plant may be monitored and measured. The elongated, transparent container encloses a growth medium, seeds and a measuring device. The measuring device is slidably inserted into the container above the seeds and the growth medium. As the plants grow from the seeds, they push the measuring device upward, physically measuring and visually demonstrating the amount of plant growth having occurred.

9 Claims, 1 Drawing Sheet

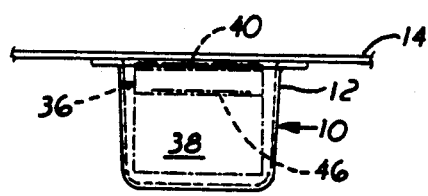
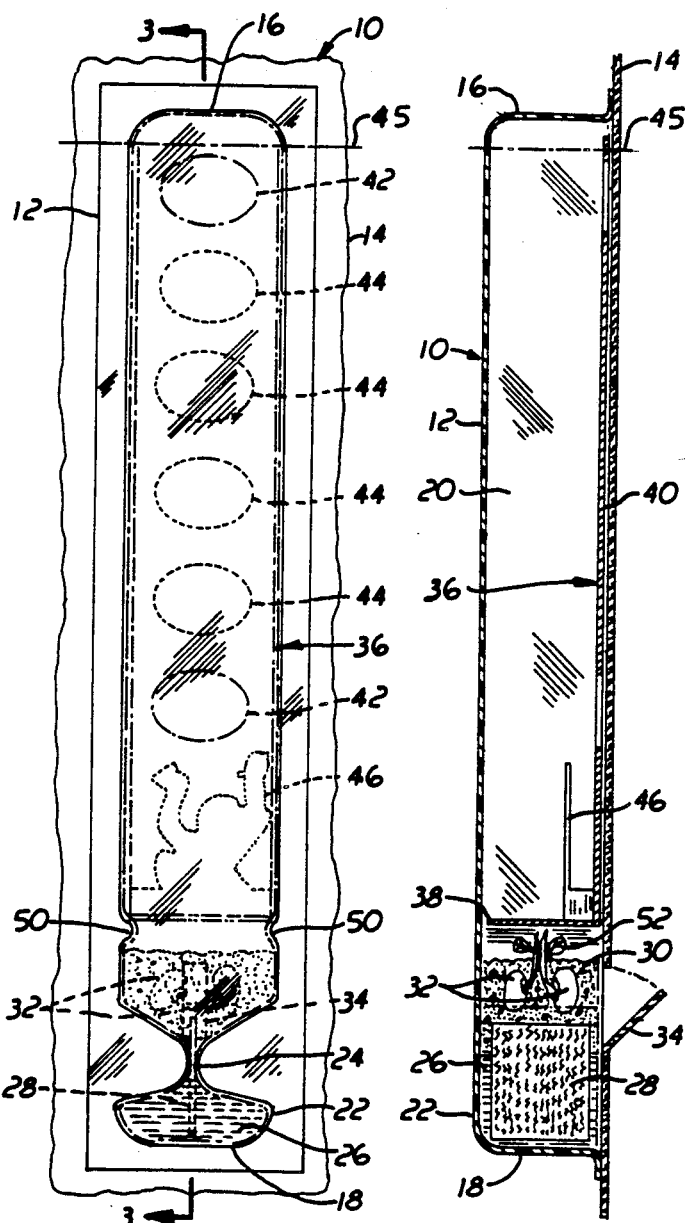
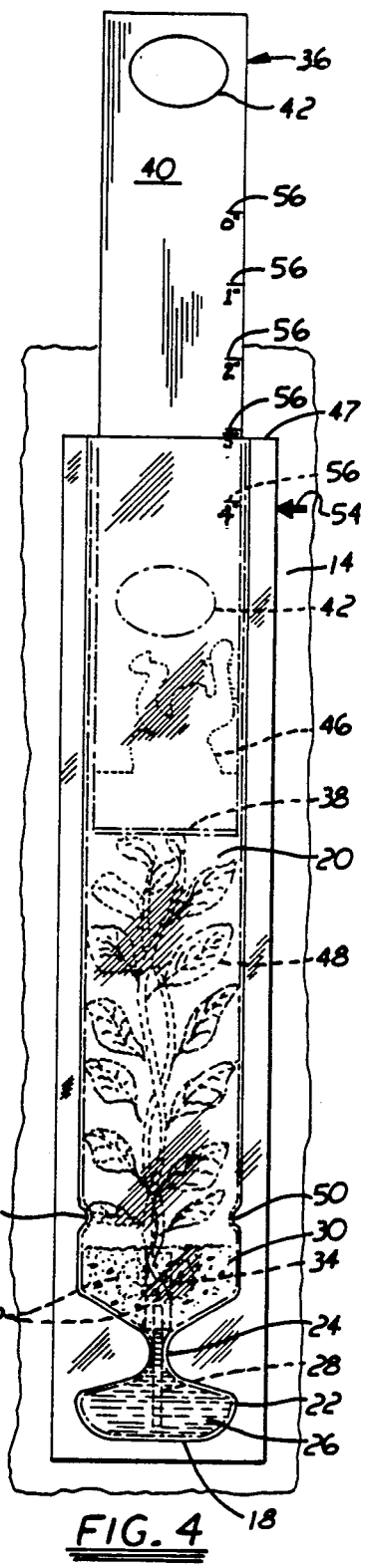

PLANT CONTAINER AND DISPLAY DEVICE

BACKGROUND OF THE INVENTION

1. Field of the Invention

The present invention relates to a plant container and display device which physically measures and visually demonstrates the amount of plant growth having occurred.

2. Description of the Prior Art

Containers for the sprouting of seeds are well known in the prior art. Some forms of containers are designed for the efficient sprouting of seeds indoors so that they may be planted outdoors when weather permits. Some containers are designed for shipping and subsequent retail display. Other forms of plant containers are designed primarily for educational and display purposes and are usually constructed of transparent material through which the sprouting of the seeds may be observed.

One invention for shipping and retail display is a plant package disclosed by U.S. Pat. No. 4,118,890 to Shore, a package for protecting, maintaining and displaying a plant from the nursery to the self-service sales outlets The package is comprised of a double container, the inner container is a flexible closed bag that contains the plant roots and soil, and the outer container encloses the root and soil bag, plus provides additional space to protect the continuing growth of the plant foliage. This outer container is constructed of light transmissive plastic that permits entry of light and provides customers with a good view of the plant foliage.

U.S. Pat. No. 4,118,889 to Lamlee, discloses a transparent container of suitable size for wearing as a necklace. The container is constructed of transparent material through which both the sprouting of the seed and the growth of a plant may be observed.

Watching a plant grow from a seed is a very interesting and educational experience for the family; however, containers in the prior art have no means of demonstrating the amount of growth that has taken place and thus, are not as interesting to monitor on a daily basis.

SUMMARY OF THE INVENTION

The present invention provides a plant container and display device in which seeds are germinated and growth of the resulting plant is observed. The amount of growth is physically measured and visually demonstrated by a sliding measuring device which moves upward as the plant grows within the container.

In the preferred embodiment, the container is formed as an elongated blister tube attached and sealed to a blister card with an easel back. The surface area of the blister card, to which the blister tube is sealed, is coated with a waterproof material so that the lower section will be watertight. The blister tube is comprised of transparent material so that plant growth may be observed within the container and words and pictures printed on the front face of the blister card and on the measuring device are visible.

When the easel is in the standing position, the blister tube is longitudinally aligned in a near vertical position. A constriction in the blister tube creates a neck section separating what is defined as an upper section and a lower section of the blister tube. The neck is located near the bottom end of the blister tube causing the lower section to be smaller than the upper section. The lower section is used as a reservoir storing the water prior to its being drawn up by a wick from the reservoir through the neck and into the plant growing medium that rests with the seeds on the bottom of the upper section. An access door is positioned directly above the neck so that water ma be added to the reservoir. The door is pre-cut by making perforations through the blister card.

The measuring device has a base shaped similar to, but slightly smaller than, a transverse cross section of the cylindrical plant container, so that it may be slidably inserted into the upper section. When there has been no plant growth, the base rests on two indentations made in the blister tube a short distance above the growth medium and seeds. After the seeds sprout, these indentations prevent the measuring device from directly resting upon and crushing the very young plants. A first vertical portion of the measuring device, a rectangular piece of paper board, is attached to the base of the measuring device extending upwardly from and generally normal to the base. A second smaller vertical portion, displaying a drawing of a climbing figure, is also attached normal to the base and extends upwardly therefrom.

Just before water is added to the plant container through the access door, the upper end of the container is removed along precut perforations. After water has been added to the reservoir, the seeds will germinate and the plants will grow upward within the plant container's upper section. As the plants grow, they will push against the base of the measuring device, which will then rise causing the first vertical portion of the measuring device to extend through the open upper end. As the measuring device rises, various messages and pictures will be seen through two holes cut in the first vertical portion. In addition, markings along the side will indicate the actual plant growth in inches or other measuring terms.

The invention accordingly comprises an article of manufacture possessing the features, properties, and the relation of elements which will be exemplified in the article hereinafter described and the scope of the invention will be indicated in the claims.

BRIEF DESCRIPTION OF THE DRAWINGS

For a fuller understanding of the nature and objects of the invention, reference should be made to the following detailed description taken ,in connection with accompanying drawings in which:

FIG. 1 is a top view of the preferred embodiment of the plant container and display device.

FIG. 2 is a front view of the plant container and display device.

FIG. 3 is a sectional view of the plant container and display device taken along line 3—3 of FIG. 2.

FIG. 4 is a front view of the plant container and display device showing plant growth having occurred and the measuring device extending beyond the top of the container.

Similar reference characters refer to similar parts throughout the several views of the drawings.

DETAILED DESCRIPTION

A preferred embodiment for the plant display container is illustrated in drawing FIGS. 1-4, with the plant display container generally shown as 10.

In FIG. 3, it can be seen that the preferred embodiment for container 10 is a blister tube 12 which is sealingly fastened to a blister card 14. While the blister tube 12 and the blister card 14 are the preferred embodiment for forming the elongated hollow cylindrical container 10, other types of containers may be used, for example, a box with an open top constructed of clear plastic that may be mounted upon a display card. The blister tube 12, formed from clear plastic, has an upper end 16 and a lower end 18.

In FIG. 2 it can be seen that the blister tube 12 has an upper section 20 and a lower section 22 which are separated by a constriction or neck 24 in the blister tube. The neck 24 is located proximate to the lower end 18 of the blister tube 12 to define the small lower section 22 which contains water 26. The bottom of the upper section 20 contains the growth medium 30 and the seeds 32. The water 26 is drawn upward by a wick 28 that extends from the lower section 22 through the neck 24 and into the upper section 20.

As shown in FIG. 3, the blister card 14 has a pre-cut access door 34 therethrough that is positioned directly above the neck 24 so that water may be added to the lower section 22.

FIGS. 2-3 best show the measuring device identified generally as 36, which has a base 38 shaped similar to, but slightly smaller than, a transverse cross section of the blister tube 12, so that the measuring device 36 may be slidably inserted into the upper section 20. A first vertical portion 40 of the measuring device 36, a rectangular piece of paper board, is attached to the base 38 of the measuring device 36 and extends upward from and generally normal to the base 38. The first vertical portion 40 has a width slightly less than the width of the upper section 20 and a length slightly less than the length of the upper section 20.

A pre-cut perforation 45 is made through the blister tube 12 so that end 16 may be removed to provide an open end 47. As can be seen in FIG. 4, growth of the plant 48 causes it to push on the base 38 of the measuring device 36 causing it to rise and extend the first portion 40 outward from the blister tube 12 at the new open end 47. The first vertical portion 40 has two apertures 42 through which indicia 44 located on the blister card 14 may be seen as the first vertical portion 40 rises and the apertures 42 become aligned with the indicia 44.

A second vertical portion 46 depicting a climbing figure is also attached normal to the base 38 and extends upward. As the measuring device 36 rises, it appears that the FIG. 46 is climbing the plant 48.

FIGS. 2 and 4 show an indentation or restricting means 50 in the blister tube 12, which prevents the measuring means 36 from resting on the newly growing plants 52.

Therefore, having thus set forth a preferred construction for the plant display container 10, it is to be remembered that this is but a preferred embodiment. Attention is now invited to a description of the use of the plant display container 10. To obtain the full benefits of the plant display container, one must remove upper end 16 by cutting along the pre-scored perforations with a knife or scissors. Also, a knife or scissors may be used to cut along the pre-perforated outline of the access door 34 to gain access to the upper section 20 of the blister tube 12. Once the access door 34 has been opened, one must remove the prepackaged growth medium 30, seeds 32, and the wick 28. The wick 28 is then inserted downward through the neck 24 into the lower section 22 of blister tube 12, however, sufficient wick 28 must remain above the neck 24 to insure sufficient contact with the growing medium 30. Water 26 may then be added through the access door 34 so that it will fill the lower section 22 of the blister tube 12. The growing medium is then inserted above the neck 24 and around the wick 28 so that the seeds 32 may be buried within the growth medium 30. The access door 34 is then temporarily closed with tape. The blister card may now be placed on its stand, so that it is close to vertical, in a sunny area.

As the water 26 rises through the wick 28, it will moisten the growth medium 30 and the seeds 32 providing a proper environment for germination of the seeds 32. Over a period of time the seeds 32 will produce new growth 52 that will eventually become a strong plant 48. As the plant 48 grows, it will push on the measuring device 36 causing it to rise in the blister tube 12. As time passes, additional water may have to be added to the lower section 22 through the access door 34. As the measuring device rises, it will appear that the FIG. 46 is climbing the plant. In addition, there are two apertures 42 through which appropriate phrases will appear as the first vertical portion 40 moves upward and the apertures 42 become aligned with the writings 44 on the blister card 14. Also, there is a ruler 56 written on the first vertical portion 40 so that as the first vertical portion rises, this ruler 56 will pass by an index 54 to indicate the amount of growth having occurred. When the plants outgrow the container 10, they may be transplanted outdoors.

Having set forth the description of use of container, it will thus be seen that the objects set forth above among those made apparent from the proceeding description are efficiently attained, and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, I claim:

1. A plant display container with seeds and growth medium comprising:
    an elongated container comprised, at least in part, of transparent material, said container having a longitudinal axis, and having upper and lower ends, said upper end being breachably closed, and said lower end being closed, whereby the growth medium and the seeds are thereby contained;
    a measuring means having a base, said base being slidably inserted into said container transverse to said longitudinal axis of said container and located above the growth medium and the seeds, whereby when the seeds sprout into plants, the plants will push upward against said base causing said measuring means to move upward.

2. A plant display container as in claim 1, wherein said measuring means further comprises a first vertical portion extending upward from and generally normal to said base.

3. A plant display container as in claim 2 further comprising indicia printed on said container, said first vertical portion of said measuring means having at least one aperture therethrough, whereby said indicia show through said aperture as the measuring means is moved upward by the growing plant.

4. A plant display container as in claim 2 wherein said measuring means comprises a plurality of vertical portions extending upward from and generally normal to said base.

5. A plant display container as in claim 1 further comprising an upper and lower section, having a neck interposed therebetween, said neck located proximal to said lower end, wherein the growth medium and the seeds are located in said upper section of said container adjacent to said neck, and wherein said upper end is breachably closed.

6. A plant display container as in claim 5 wherein said wick is comprised of felt material.

7. A plant display container as in claim 5 further comprising a restriction means in said upper section of said container, proximal to the growth means whereby said measuring means is prevented from resting on the growth medium.

8. A plant display container as in claim 5 further comprising an access door, said access door opening into said upper section adjacent to said neck.

9. A plant container with seeds and growth medium comprising an elongated container comprised, at least in part, of transparent material, said container having upper and lower ends to define a longitudinal axis therebetween, said lower and end being closed, said upper end being breachably closed, said container having an upper and lower section defined by a neck interposed between said upper and lower section of said container, said neck located proximal to said lower end, and an access door into said upper section of said container, said door opening into said upper section at a point adjacent to said neck;
- a wick having an upper end and a lower end, said wick extending through said neck, said lower end of said wick extending downward from said neck to a point substantially adjacent to said lower end of said container and said upper end extending upward from said neck into the growth medium;
- a measuring means having a base, said base being slidably inserted into said upper section of said container transverse to said longitudinal axis of said container, and a plurality of vertical portions extending upward from and generally normal to said base; and
- a restriction means in said upper section of said container, proximal to the growth means whereby said measuring means is prevented from resting on the growth medium.

* * * * *